United States Patent [19]
Haynes et al.

[11] Patent Number: 5,842,177
[45] Date of Patent: Nov. 24, 1998

[54] MANAGEMENT OF CALENDAR EVENTS IN A DATA PROCESSING SYSTEM

[75] Inventors: Thomas R. Haynes, Euless; Gregory Peter Fitzpatrick, Keller, both of Tex.

[73] Assignee: International Business Machines Corporation, Armonk, N.Y.

[21] Appl. No.: 366,158

[22] Filed: Dec. 29, 1994

[51] Int. Cl.⁶ .................................................. G06F 15/16
[52] U.S. Cl. .................. 705/8; 364/705.07; 364/705.08; 705/9
[58] Field of Search .................. 395/201, 207, 395/208, 209, 200.01, 200.04, 326, 329; 364/468.03, 468.05, 468.06, 468.07, 569, 705.06, 705.07, 705.08; 705/8, 7, 9

[56] References Cited

U.S. PATENT DOCUMENTS

| | | | |
|---|---|---|---|
| 5,050,077 | 9/1991 | Vincent | 395/208 |
| 5,129,057 | 7/1992 | Strope et al. | 395/348 |
| 5,197,000 | 3/1993 | Vincent | 395/208 |
| 5,323,314 | 6/1994 | Barber et al. | 395/208 |
| 5,500,938 | 3/1996 | Cahill et al. | 395/326 |

OTHER PUBLICATIONS

Fresko–Weiss; "Microsoft Adds Scheduling to its E–mail System"; *PC Magazine;* v11 n19; p. 56(1); Nov. 10, 1992; Dialog: File 148, Acc#06140060.

"Introduction to Schedule+"; The Professional Development Group, Inc.; pp. 85–113; Copyright May, 1993.

Printout from Schedule+ Help File from Microsoft Windows for Workgroups Version 3.11; Copyright 1985–1993; Microsoft Corporation.

*Primary Examiner*—Robert A. Weinhardt
*Assistant Examiner*—Stephen R. Tkacs
*Attorney, Agent, or Firm*—Edward H. Duffield; Daniel E. Venglarik; Andrew J. Dillon

[57] ABSTRACT

A method and system for managing events within a calendar program executing within the data processing system. Selected events are associated with each other. An action is performed on the selected events in response to a completion of one of the selected events. The action performed may be marking the selected events as being completed or deleting the selected events. Similar actions may be performed on the selected events in response to a deletion of one of the selected events.

17 Claims, 7 Drawing Sheets

| ID | Event | Attribute |
|---|---|---|
| ID 1 | E 1 | 1 |
| ID 1 | E 2 | |
| ID 1 | E 3 | |
| ID 1 | E 4 | |

MANAGEMENT OF CALENDAR EVENTS IN A DATA PROCESSING SYSTEM

BACKGROUND OF THE INVENTION

1. Technical Field

The present invention is generally related to an improved data processing system and in particular to a method and system for managing a calendar in a data processing system. Still more particularly, the present invention relates to a method and system for managing calendar events for a user in which only one will be attended by the user.

2. Description of the Related Art

The manipulation of data in a data processing system is well known in the prior art. Data may be manipulated in many ways in a data processing system including: data accessing; data encoding; data communications; data compression; data conversion; data entry; data exchange; data filing; data linking; data locking; data manipulation; data mapping; data modeling; data processing; data recording; data sorting; and data transferring. The large amounts of data which are available to the user of a data processing system often become overwhelming in magnitude and complexity.

As a result of the increasing complexity of data processing systems, attempts have been made to simplify the interface between a user and the large amounts of data present within a modern data processing system. One example of an attempt to simplify the interface between a user and a data processing system is the use of a so-called Graphical User Interface (GUI) to provide an intuitive and graphical interface between the user and the data processing system. The Common User Access (CUA) user interface is one example of such a GUI. "Common User Access" and "CUA" are trademarks of International Business Machines Corporation. The CUA interface is often employed to organize and present large amounts of data to a user in a graphical and intuitive manner. CUA employs windows and various other graphic presentations to provide a simplified interface to the user. More information on CUA can be found in Systems Applications Architecture Common User Access Advanced Interface Design Reference available from International Business Machines Corporation, SC34-4290-00.

One example of the usefulness of a GUI in managing large amounts of information is a calendar program in which a user may manage information regarding events such as appointments and meetings that occur over different periods of time. A calendar typically provides various views to the user. Typically, a calendar provides a day view in which the user may view and manage events occurring during a single full day. Additionally, a calendar may be altered to display events occurring over a month. In entering events a user typically will use a day view and type text describing the particular event next to a time during which the event occurs. Additionally, a user may also set an audible alarm as a reminder that an event is about to occur.

Users often post entries within a calendar program for a series of events, only one of which the user will attend. Presently, the user must post all entries to the calendar and individually delete each entry in the series of events once any one of the meetings or events have been attended. For example, often times several sections of a class may occur at different dates or during different times. The user does not know when it will attend so all of the possible dates and times are posted to the calendar program. Therefore, it would be advantageous to have a method and system for efficiently managing entries for events in which only one of which will be attended.

SUMMARY OF THE INVENTION

It is one object of the present invention to provide an improved data processing system.

It is another object of the present invention to provide a method and system for managing a calendar in a data processing system.

It is yet another object of the present invention to provide a method and system for managing calendar events for a user in which only one will be attended by the user.

The present invention provides a method and system for managing events within a calendar program executing within the data processing system. Selected events are associated with each other. An action is performed on the selected events in response to a completion of one of the selected events. The action performed may be marking the selected events as being completed or deleting the selected events. Similar actions may be performed on the selected events in response to a deletion of one of the selected events.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
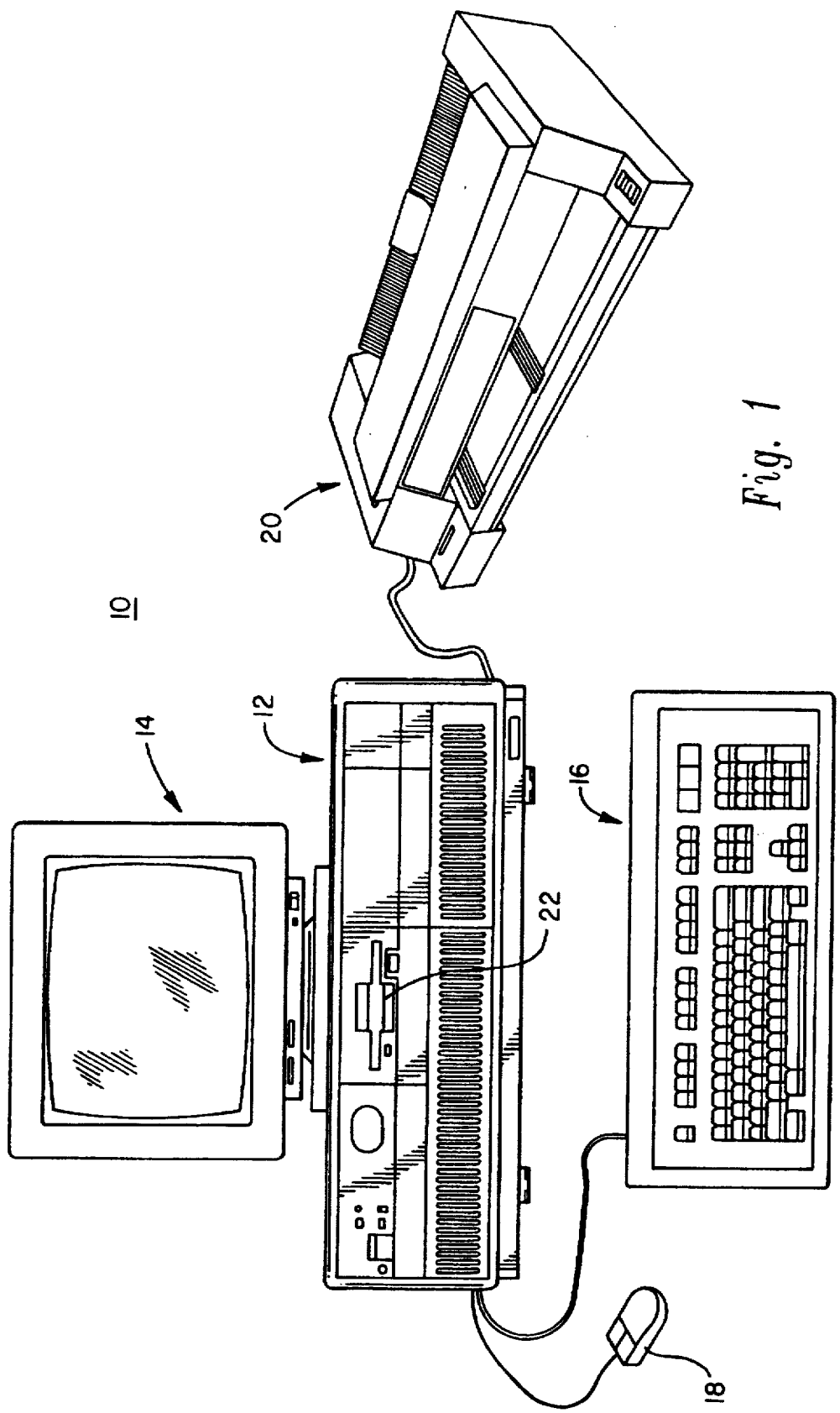
FIG. 1 depicts a data processing system in the form of a personal computer in which the present invention can be employed is depicted.

With reference now to the figures and in particular with reference to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST. A memory within personal computer system 10 includes instructions implementing a preferred embodiment of the invention as detailed below.

Figure 2:
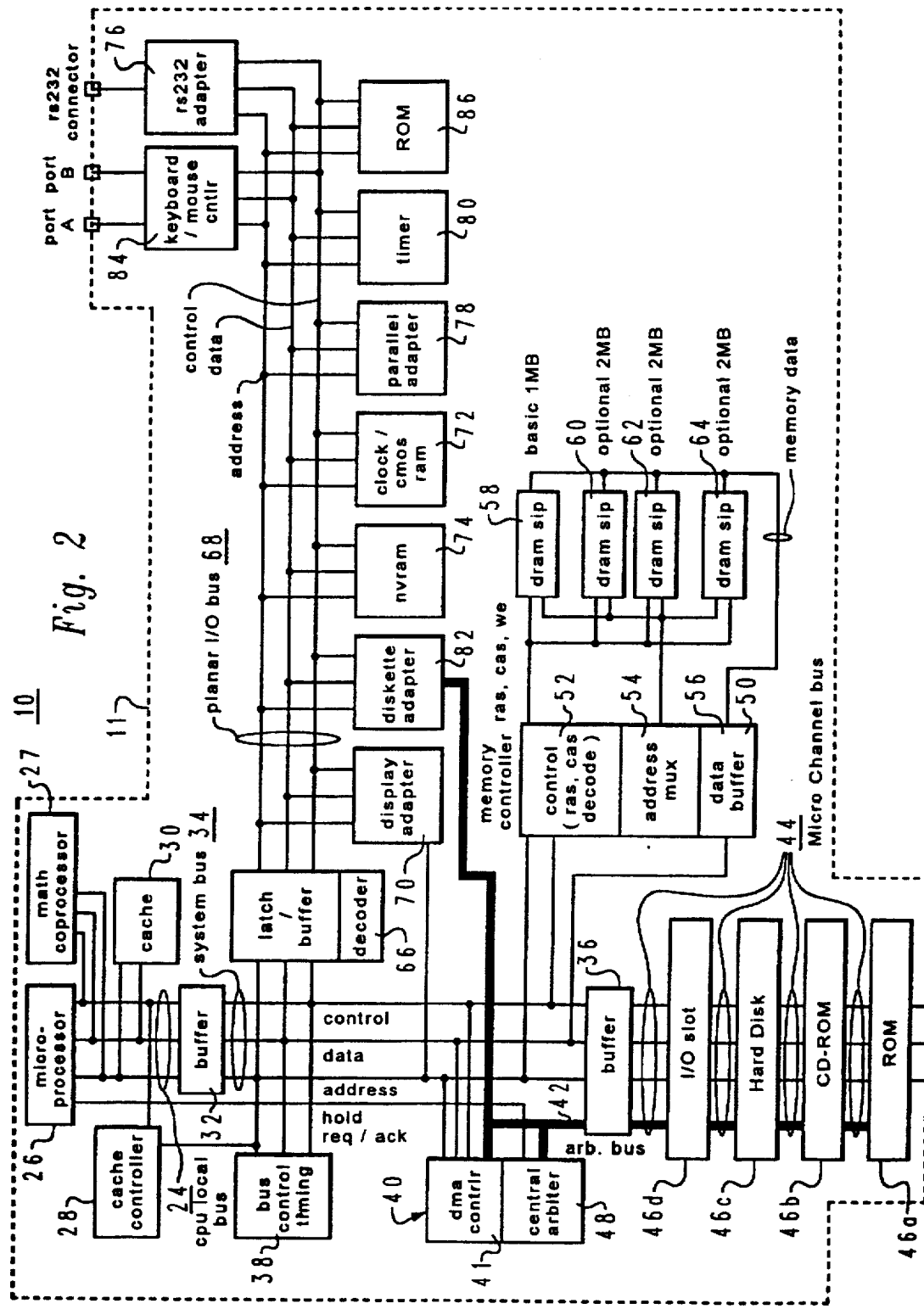
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46a–46d and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60, 62 and 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system.

Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
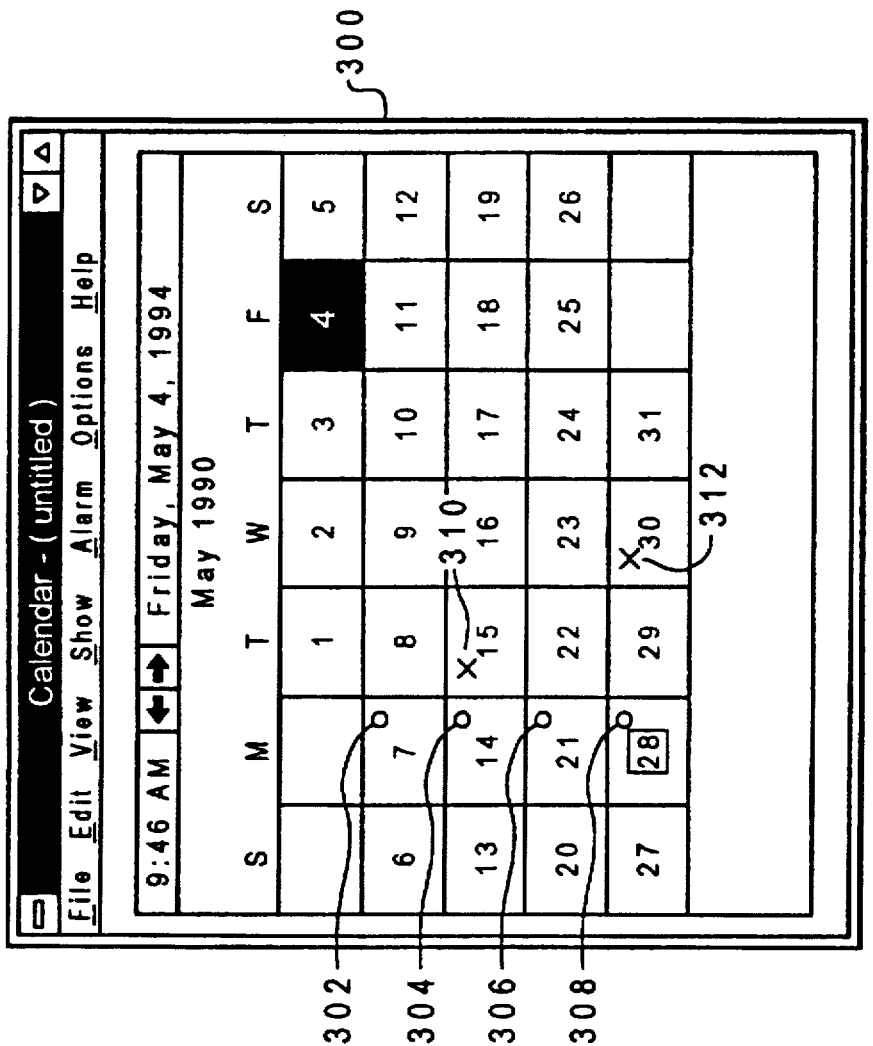
FIG. 3 is a pictorial view of a window for a calendar program depicted in accordance with a preferred embodiment of the present invention.

With reference now to FIG. 3, a pictorial view of a window for a calendar program is depicted in accordance with a preferred embodiment of the present invention. Window 300 contains calendar events 302, 304, 306 and 308 which are marked by the symbol "o". These events are marked May 7, May 14, May 21, and May 28 respectively. Window 300 also includes entry 310 as indicated by the symbol "x" on May 15th and entry 312 as indicated by the symbol "x" on May 30. In the depicted example, entries 302, 304, 306, and 308 are for a series of events only one of which a user will attend.

Figure 4B:
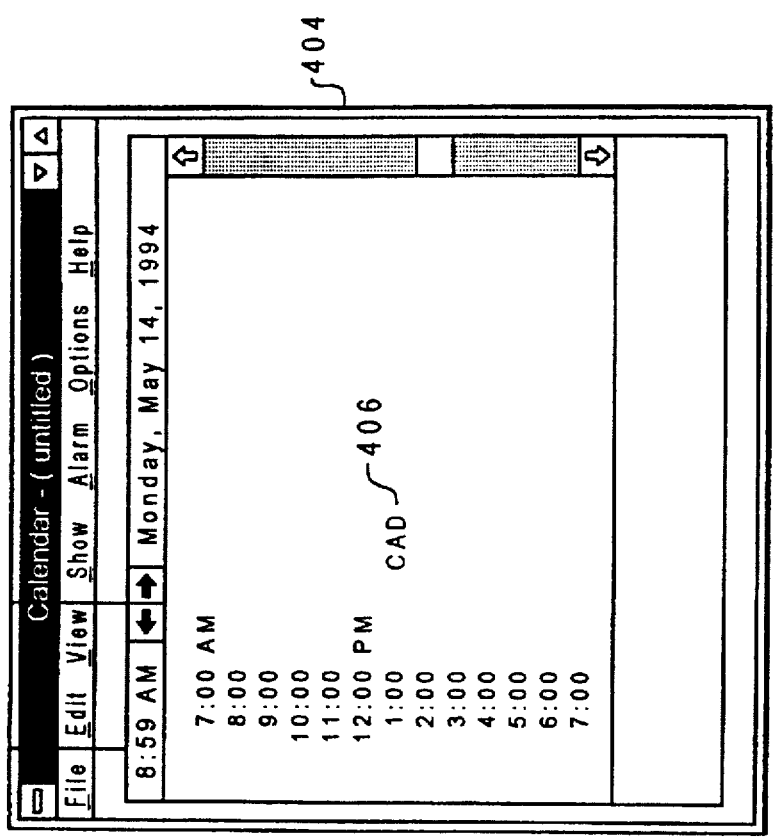
FIGS. 4A–4D are pictorial illustrations of day views in a calendar program in which an event is entered in accordance with a preferred embodiment of the present invention.
Figure 4A:
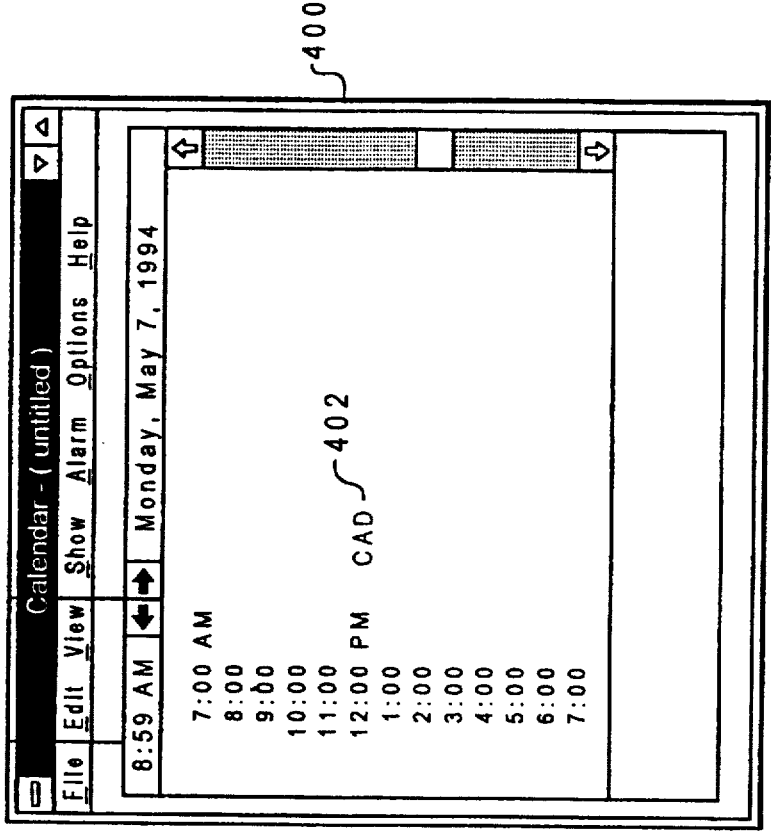
Figure 4D:
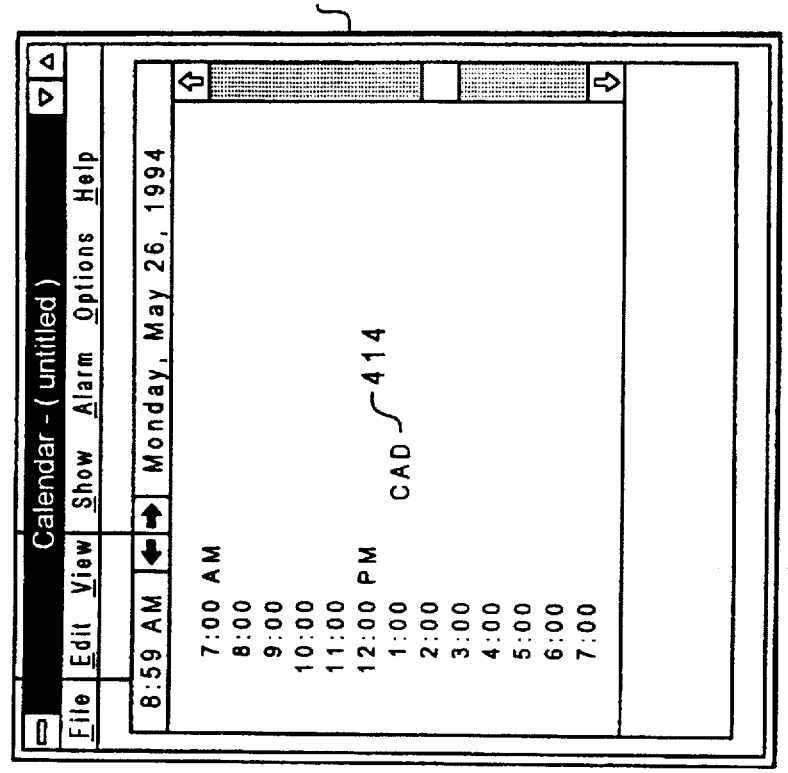
Figure 4C:
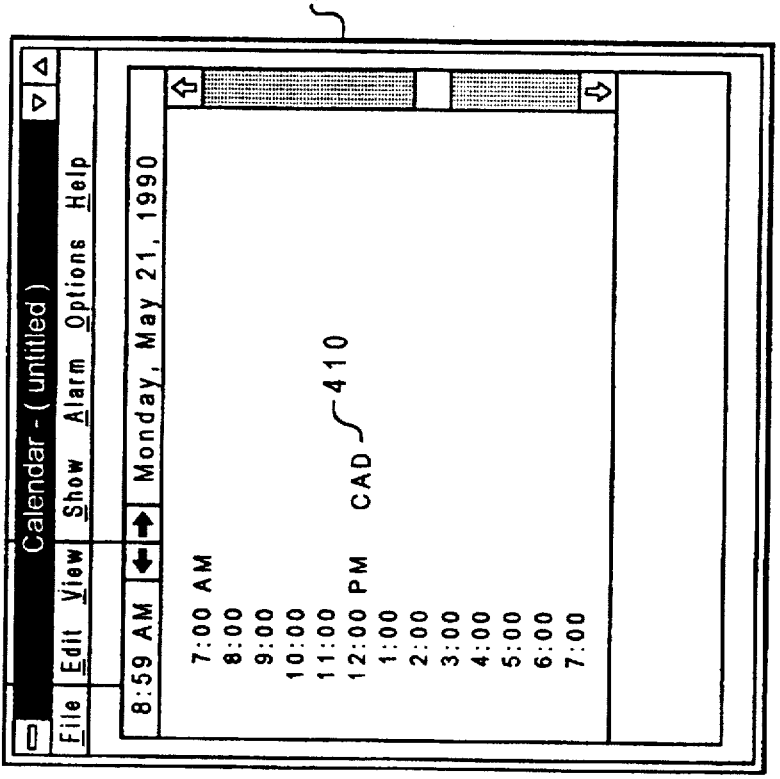

With reference now to FIG. 4A, a pictorial view of a window containing a day view for a calendar program is depicted in accordance with a preferred embodiment of the present invention. Window 400 is a day view for Monday, May 7, 1994, for the calendar illustrated in FIG. 3. In particular, entry 302 from FIG. 3 is a Computer Aided Design (CAD) class set for 12:00 p.m., as shown in field 402. In FIG. 4B, window 404 is a day view in a calendar program in which entry 304 is a CAD class scheduled for Monday, May 14, 1994, at 1:00 p.m. as depicted in field 406. With reference to FIG. 4C, window 408 illustrates a day view of a calendar program for Monday, May 21, 1994, in which entry 306 from window 400 is a CAD class scheduled for 12:00 p.m., as illustrated in field 410. Window 412 in FIG. 4D is a day view from FIG. 3 for Monday, May 26, 1994, in which entry 308 is CAD class scheduled for 1:00 p.m. as depicted in field 414.

The user entering these entries in the calendar program will only attend one of these classes because each class is an identical class scheduled for different days and times during the month of May in the depicted example. If the user attends the CAD class on Monday, May 14 and either deletes entry 304 or marks that entry as completed the presently claimed invention will either delete or mark as completed the remaining entries for the class during the rest of the month.

The present invention provides a process to specify an arbitrary number of calendar entries in an exclusive OR (XOR) grouping. In such a grouping, the XOR grouping would be specified for the events and the process would then mark each item with a unique identifier, as well as maintaining a master group record containing the XOR designation. Any individual event in the series of events is exclusive of the other events in an XOR grouping. For example, a series of events in which a user would attend only one of the series may be marked as an XOR grouping. As a result, the process of the present invention allows the group of events to be posted with a single action or to be removed with a single action. In addition, marking a single XOR event as completed or deleting the event would result in all other entries in the same XOR configuration to be removed in accordance with a preferred embodiment of the present invention. A user may mark events in an XOR grouping while posting entries for events or may receive them already grouped together by some other user in accordance with a preferred embodiment of the present invention.

Figures 5, 6:
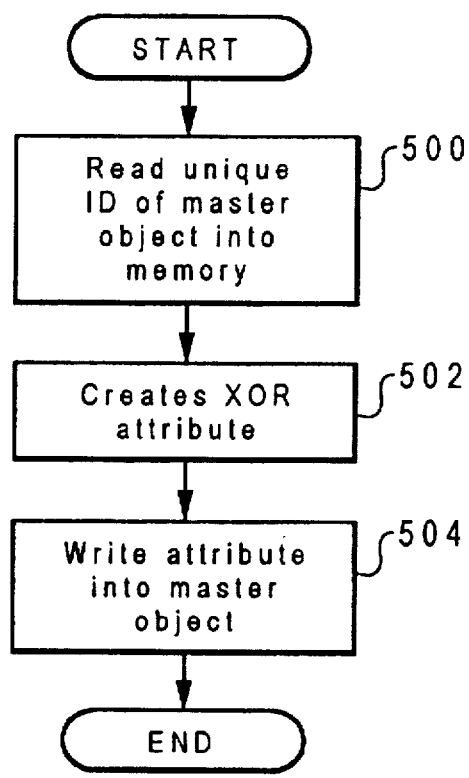
FIG. 5 is a flowchart of a process for grouping events into an XOR group in accordance with a preferred embodiment of the present invention.
FIG. 6 is a pictorial representation of a master object in accordance with a preferred embodiment of the present invention.

With reference now to FIG. 5, a flowchart of a process for grouping events into an XOR grouping is depicted in accordance with a preferred embodiment of the present invention. The process begins by reading the unique ID of the master object into memory (step 500). The process then creates an attribute for the master object (step 502). Thereafter, the process writes the attribute into the master object (step 504).

With reference to FIG. 6, a pictorial representation of a master object is depicted in accordance with a preferred embodiment of the present invention. Master object 600 includes a unique XOR ID, ID1 group for each entry, E1–E4. Master object 600 also includes attribute field 610, which indicates whether events within master object 600 are grouped together in an XOR grouping in accordance with a preferred embodiment of the present invention. In the depicted example, the XOR attribute in field 610 is a "1" indicating master object 600 is an XOR master object. A "0" in field 610 would indicate that the master object was not an XOR master object.

Figure 7:
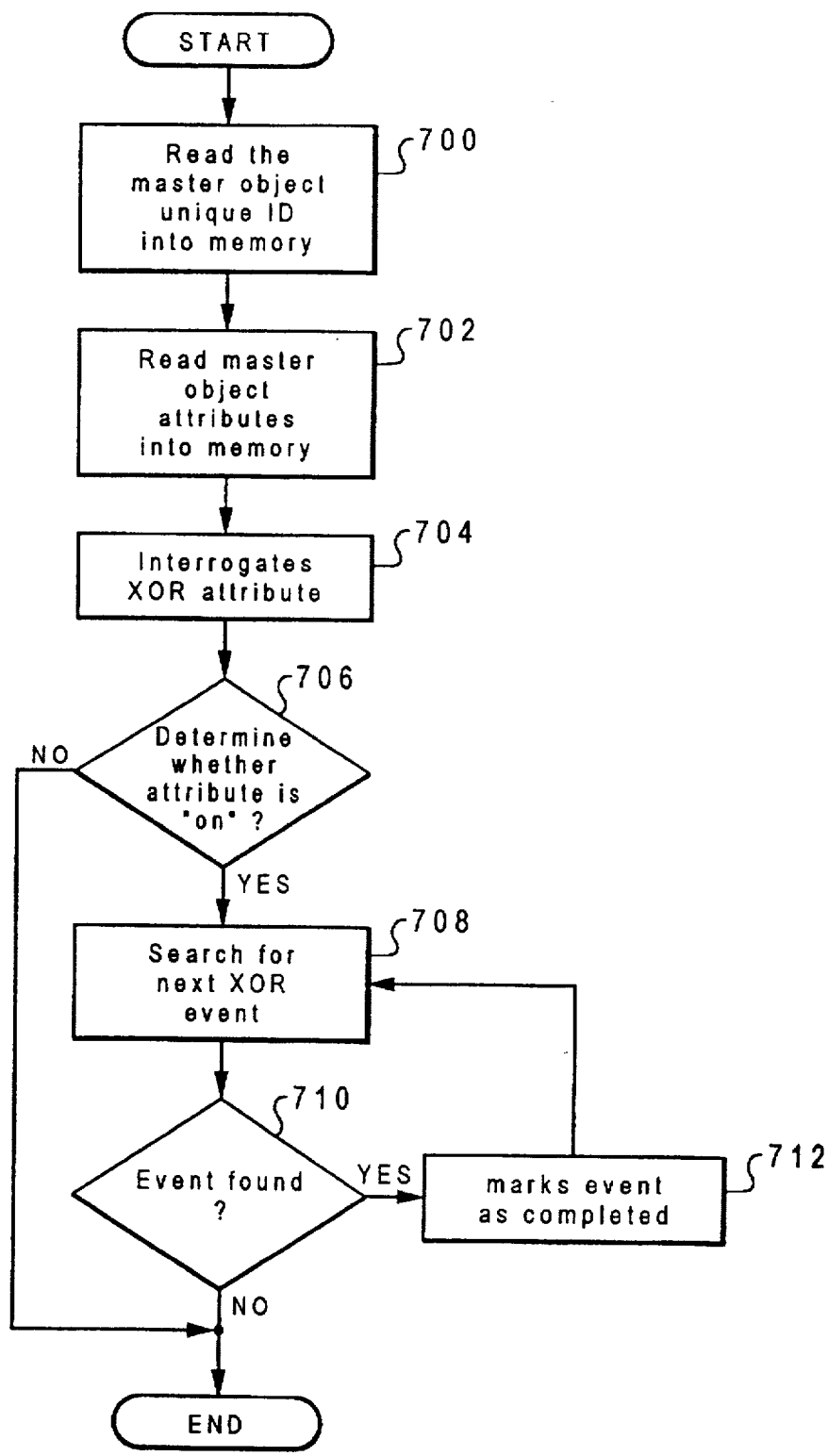
FIG. 7 is a flowchart of a process for processing XOR events in response to a completion of an event within an XOR grouping in accordance with a preferred embodiment of the present invention.

With reference now to FIG. 7, a flowchart of a process for processing XOR events in response to a completion of an event within an XOR grouping is depicted in accordance with a preferred embodiment of the present invention. The process begins by reading the master object unique ID into memory (step 700). Thereafter, the master object attributes are read into the memory of the data processing system (step 702). Attributes other than whether the master object is in an XOR master object may be included in a master object in accordance with a preferred embodiment of the present invention.

The process then interrogates the XOR attribute (step 704). A determination of whether the attribute is to "on" (e.g., a "1") is made after interrogation (step 706). If the attribute is on, the process then searches for the next XOR event having the unique ID matching the one retrieved from the master object (step 708). The process then determines whether an event having a unique ID matching the ID retrieved from the master object has been found (step 710). If an event with a matching ID has been found, the process marks the event as completed (step 712). The process returns to step 708. If, however, no other events having a unique ID matching that of the master object are present, the process then terminates. With reference again to step 706, if the XOR attribute is set to off or a "0", the process also terminates.

The processes depicted in FIGS. 3–7 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for managing events, the data processing system having a calendar program including a plurality of events, the method comprising:
   selecting a group of events within the plurality of events;
   associating the group of events such that only one event within the group of events must be completed; and
   performing an action on the group of events in response to a completion of an event within the group of events, wherein events within the calendar program are efficiently managed.

2. The method of claim 1, wherein the performing step comprises marking the group of events as completed in response to an indication of completion of one of the group of events.

3. The method of claim 1, wherein the step of performing an action comprises deleting the group of events in response to a deletion of one of the group of events.

4. The method of claim 1, wherein the associating step comprises associating a unique group identifier with each event within the group of events.

5. The method of claim 1, wherein the associating step further comprises storing the unique group identifier associated with the group of events in a data structure.

6. A data processing system including a calendar program, comprising:
   selection means for selecting a group of events within the plurality of events;
   association means for associating the group of events such that only one event within the group of events must be completed; and
   performing means for performing an action on the group of events in response to a completion of an event within the group of events, wherein events within the calendar program are efficiently managed.

7. The data processing system of claim 6, wherein the performing means comprises means for marking the group of events as completed in response to an indication of completion of one of the group of events.

8. The data processing system of claim 6, wherein the performing means comprises means for deleting the group of events in response to a deletion of one of the group of events.

9. The data processing system of claim 6, wherein the association means comprises means for associating a unique group identifier with the group of events.

10. The data processing system of claim 6, wherein the association means further comprises means for storing the unique group identifier associated with the group of events in a data structure.

11. A method in a data processing system for managing events in a calendar program wherein a collection of the events may be associated with a unique collection identifier and an XOR attribute, the method comprising:
    identifying a collection of events associated with a unique collection identifier;
    determining whether an XOR attribute associated with the collection of events has been set; and
    performing an action on the collection of events in response to a determination that the XOR attribute has been set, wherein events within a calendar program are efficiently managed.

12. The method of claim 11, wherein the step of performing an action comprises deleting the collection of events in response to a determination that the XOR attribute has been set.

13. The method of claim 11, wherein the step of performing an action comprises marking the collection of events as completed in response to a determination that the XOR attribute has been set.

14. A storage device readable by a data processing system and encoding data processing system executable instructions for managing events within a calendar program, the storage device comprising:
    means for selecting a group of events within the plurality of events;
    means for associating the group of events such that only one event within the group of events must be completed; and
    means for deleting the group of events in response to a completion of one of the group of events, wherein the means are activated when the storage device is connected to and accessed by a data processing system.

15. The storage device of claim 14, wherein the storage device is hard disk drive.

16. The storage device of claim 14, wherein the storage device is a ROM for use with a data processing system.

17. The storage device of claim 14, wherein the storage device is a floppy diskette.

* * * * *